United States Patent [19]

Matuoka et al.

[11] 3,950,701

[45] Apr. 13, 1976

[54] REAR VIEW MIRROR FOR A TWO-WHEELED VEHICLE

[75] Inventors: Nozomu Matuoka, Yao; Harumi Kitatani, Higashiosaka; Shuzo Isogami, Yao; Masaaki Ishibashi; Tomohiko Uemura, both of Takatuki, all of Japan

[73] Assignee: Hoshidenkiseizo Kabushikikaisha, Yao, Japan

[22] Filed: Nov. 2, 1973

[21] Appl. No.: 412,311

[30] Foreign Application Priority Data
Apr. 14, 1973 Japan.......................... 48-44983[U]
Apr. 14, 1973 Japan.......................... 48-44984[U]
Apr. 14, 1973 Japan.......................... 48-44985[U]

[52] U.S. Cl................................ 325/312; 325/361
[51] Int. Cl.².......................................... H04B 1/08
[58] Field of Search........... 325/310, 312, 352, 361; 179/1 VE; D56/4 B; D6/130; 179/101, 102, 103

[56] References Cited
UNITED STATES PATENTS
2,490,563   12/1949   Gastle................................ 325/312
3,099,797   7/1963   Piccinini............................ 325/312
3,714,412   1/1973   Franklin............................. 325/312

FOREIGN PATENTS OR APPLICATIONS
501,155   6/1930   Germany........................... 325/310

Primary Examiner—Benedict V. Safourek
Attorney, Agent, or Firm—Flynn & Frishauf

[57] ABSTRACT

A rear view mirror for a two-wheeled vehicle with a radio receiver set contained in the mirror case housing.

12 Claims, 15 Drawing Figures

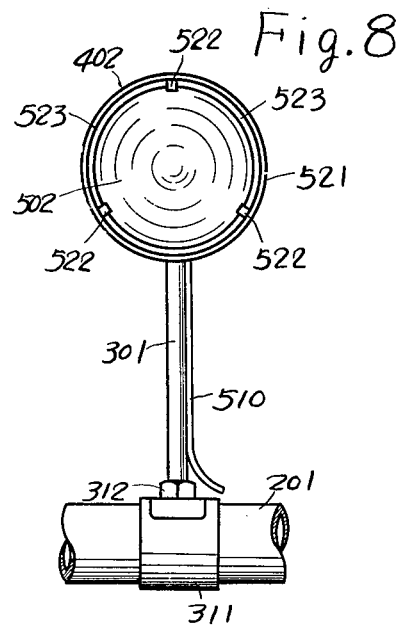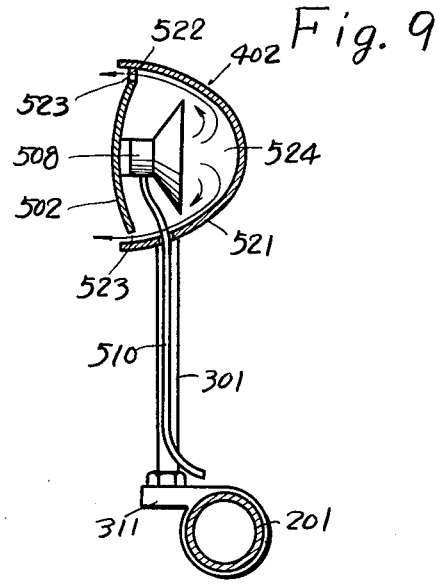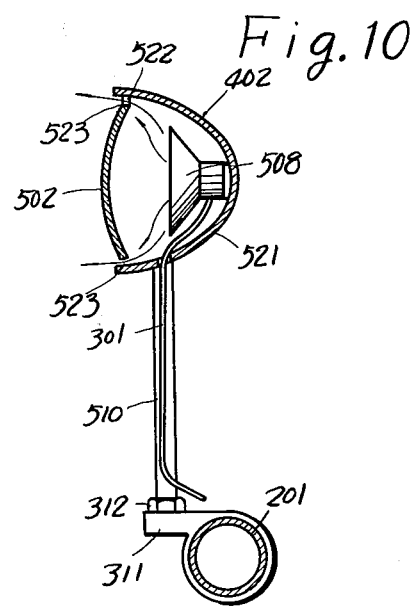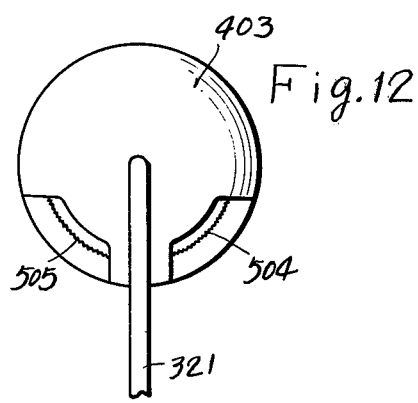

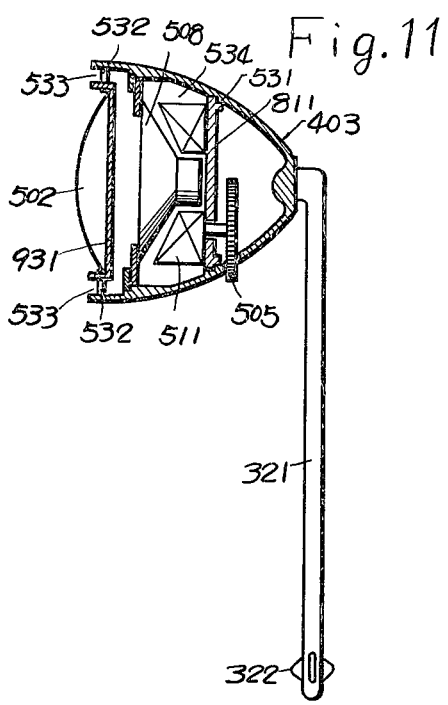
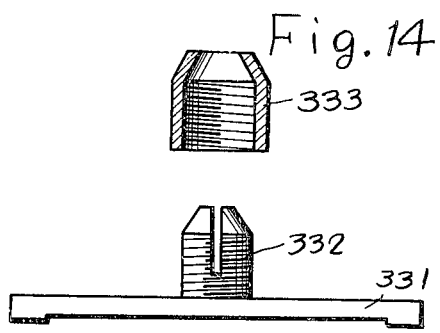
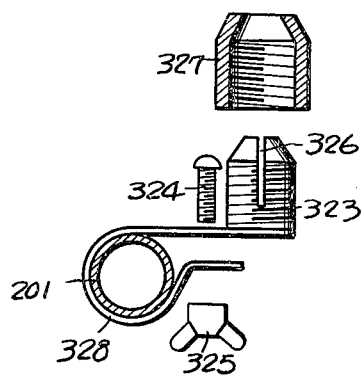
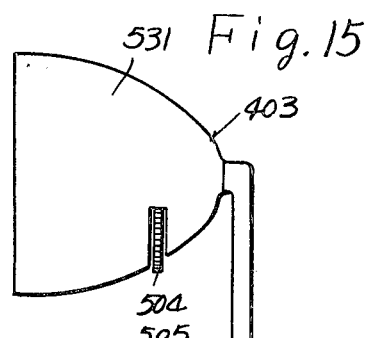
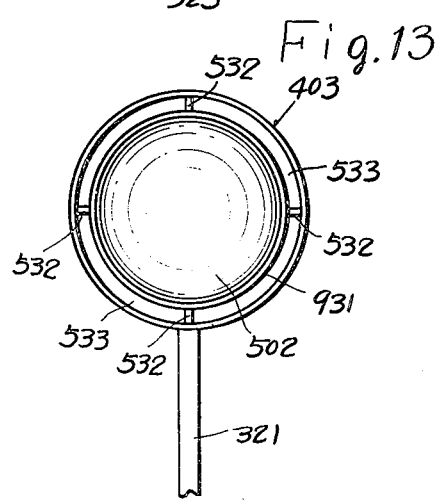
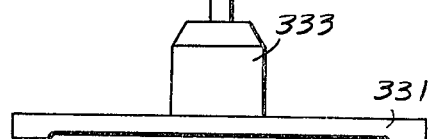

REAR VIEW MIRROR FOR A TWO-WHEELED VEHICLE

BACKGROUND OF THE INVENTION

This invention relates to a rear view mirror, and more particularly a rear view mirror suitable for a two-wheeled vehicle and which contains internally a loud speaker for radio receiving purposes. In the prior art, when a two-wheeled vehicle rider needs to listen to a radio broadcast, normally the rider manipulates a portable radio set during the ride. This is sometimes very dangerous and cumbersome.

SUMMARY OF THE INVENTION

The present invention yields to an inexpensive and an easily-accesible rear view mirror with a loud speaker built in the case housing. The present invention further provides a rear view mirror which is able to be recessed from a handle bar so as to be used as a stand mirror with a radio receiving set.

BRIEF DESCRIPTION OF THE DRAWINGS

FIG. 8 is a front view of the mirror which is related to another embodiment of this invention;

FIG. 9 is a cross-sectional view of the mirror of FIG. 8;

FIG. 10 is a cross-sectional view of another embodiment related to FIG. 8;

FIG. 11 shows still another embodiment of a rear view mirror of this invention;

FIG. 12 is a rear view of FIG. 11;

FIG. 13 is a front view of FIG. 11;

FIG. 14 shows a partial cross-sectional view of one embodiment of a laying stand for the rear view mirror of FIG. 11; and FIG. 15 is a side view of the rear view mirror of FIG. 11 with the laying stand of FIG. 14.

DETAILED DESCRIPTION OF THE INVENTION

Figure 1:
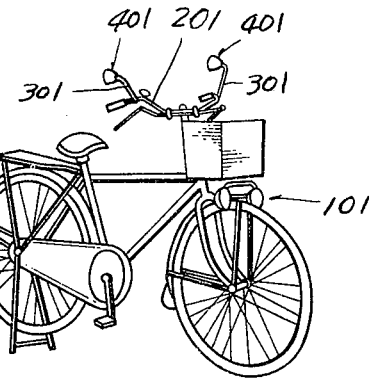
FIG. 1 shows a over-all profile of one embodiment of a rear view mirror of this invention mounted on a bicycle.

In FIG. 1, a rear view mirror 401 concerning one embodiment of this invention is mounted on the handle bar 201 with an aid of the support arm 301.

Figure 2:
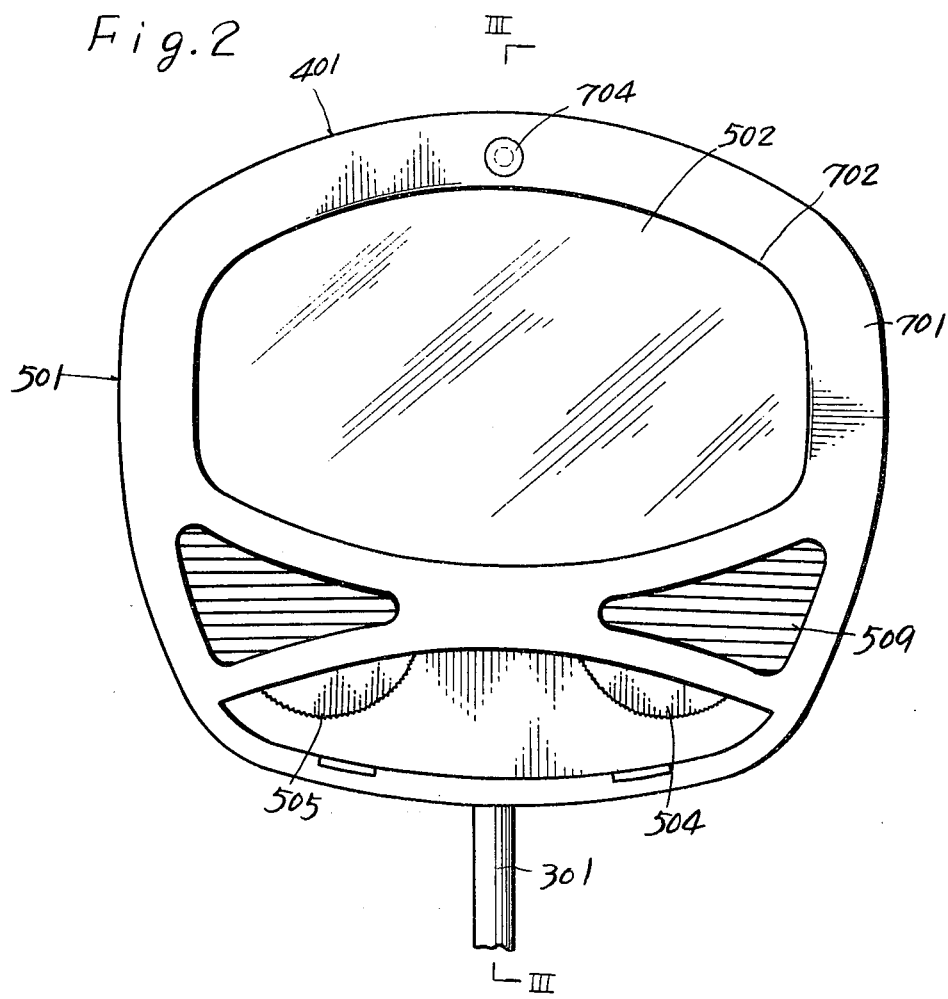
FIG. 2 is a front view of the rear view mirror of FIG. 1 in enlarged scale.

This rear view mirror 401 as shown in FIG. 2 comprises its case housing 501 and a convex or plain mirror 502.

Figure 3:
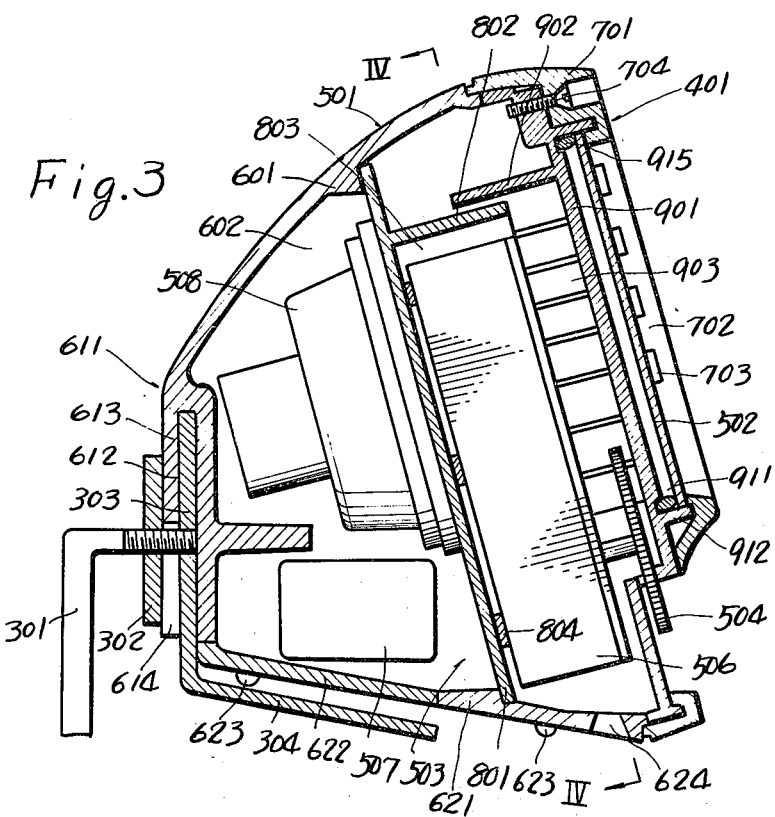
FIG. 3 shows a cross-sectional view of the rear view mirror of FIG. 1.

In FIG. 3, this case hosing 501 is separated in two parts, one is the rear case housing 601 which forms the compartment 602 and the other is the front case housing 701 to which said mirror 502 is attached adjacent. In the rear case housing 601, the radio receiver hardware 503 is mounted inside of the compartment 602. This radio receiver hardware comprises a loudness control and power on-off switch knob 505, a tuning control knob 504, a circuit board 506, a battery 507 and a loud speaker 508. The circuit board 506 and the loud speaker 508 facing to the front are mounted on a center panel 801 which is placed on the center of the rear housing 601.

The two control knobs 505, 504 are mounted on the surface of the front housing 501 for the purpose of easy-access.

The audio sound from the loud speaker 508 passes through a slotted window 509 on the front face of the front case housing 501. The rear part of the rear housing 601 forms a supporting assembly 611 including a supporting arm 301. This supporting assembly includes a back plate 613 which is spaced to form a gap 612 and a slot 614 from the bottom of the back plate 613 to the middle. The support arm 301 has a right-angle bent portion and its bent portion is threaded and screwed in with a circular locking plate 302. Also, on the end of the threaded portion of said arm 301, "L" shaped mounting plate 304 is attached.

The L-shaped mounting plate 304 is inserted into the gap 612 and the bent portion of said arm 301 is slid into the slot 614 which is on the back plate 613. Then said mounting plate 304 and the back plate 613 are secured by screwing the threaded circular locking plate 302 against the back plate 613.

In this manner, the rear view mirror 401 is easily mounted on the support arm 301. Dismounting is by simply unscrewing the circular locking pulling plate 302, said mirror 401 upwardly and then sliding out L-shaped mounting plate 304 through the gap 612. The mirror and said arm 301 are designed to be an easy-recess mount.

The bottom surface 621 of the rear case housing 501 is flat and is centered such that the center of gravity of said mirror 401 is perpendicular thereto. The reason behind this design is that said mirror 401 can be set steadily on a place such as a desk, etc and used as an ordinary stand mirror with a radio receiver set. Furthermore, in order to set the device in a more stable manner even on bumpy surface, a plural number of stand-off tips 623 are preferred to be provided on the bottom surface 621.

Also on the bottom surface 621, a removable lid 622 is provided for battery 507 exchange purposes and the front portion of said surface 621 has a hole 624 which is used for drainage purposes.

Figure 4:
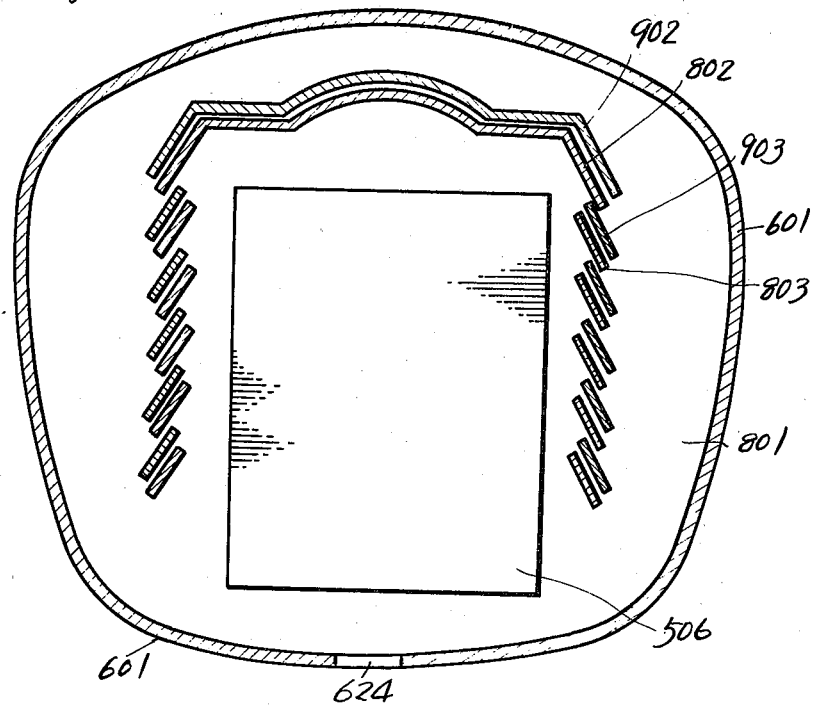
FIG. 4 is a cross-sectional view of the cross section IV—IV of FIG. 3.

In FIG. 4, on the surface of said center panel 801, a roof shaped side panel 802 and a side wall panel 803 are attached and extended to the front direction of said case housing 601.

The radio receiver circuit board 506 is placed in and surrounded by said panels 802 and 803.

Preferably, circuit board 506 is mounted with a cushion 804 for shock absorbing purposes.

Said loud speaker 508 has a water proof cone so that said mirror can be in outdoor use.

A front reinforcing panel 901 has also a roof shaped panel 902 and a side wall panel 903. These said panels 902 and 903 shown in FIG. 4 are alternately cascaded with the other said panels 802 and 803 attached on the center panel 801. Hence even if water leaks into the case housing, the water flows on these surrounding panels 802, 803, 902 and 903 and finally drains out through the said hole 624. Therefore, the circuit board 506 is protected from water leakage.

Figure 5:
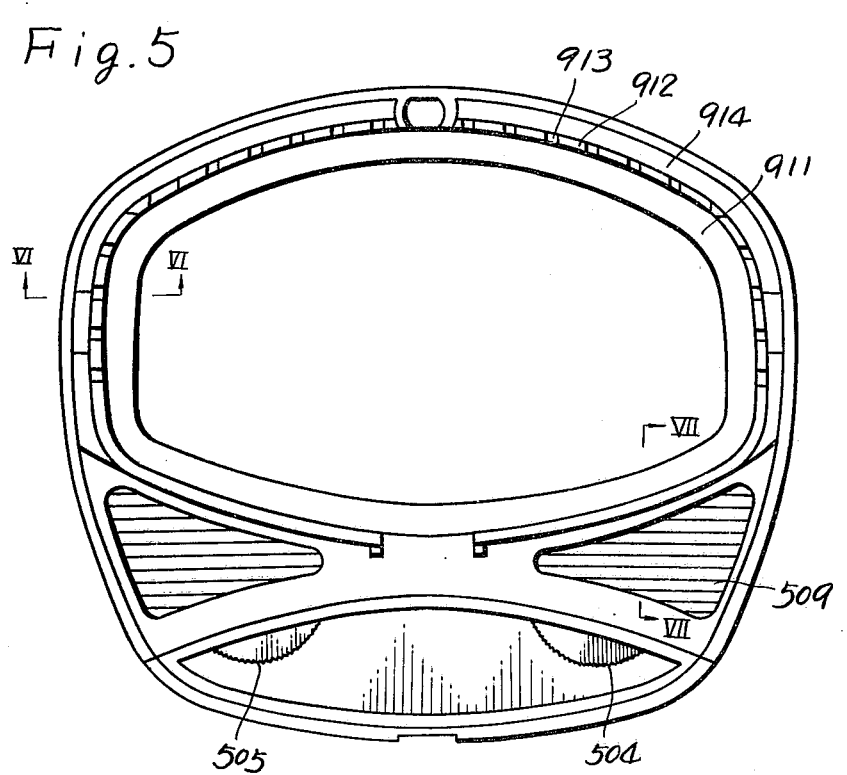
FIG. 5 shows a front view of the detailed member 901 of FIG. 3.
Figure 6:
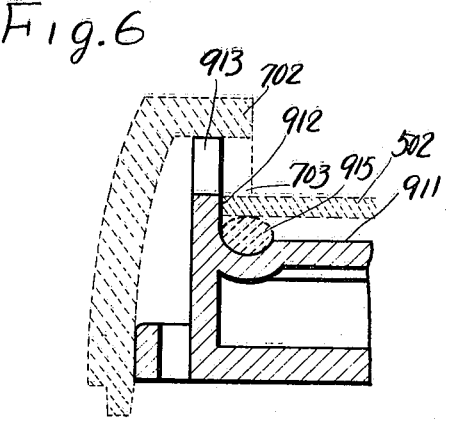
FIG. 6 is a cross-sectional view taken along the line VI—VI of FIG. 5.

At the front portion of said panel 901, a slotted loop frame 911 is placed as shown in FIGS. 5 and 6. On this said frame 911, said mirror 502 is attached with a rubber bushing 915. Frame 911 is formed to be a looped hub 912 at the edge. This said hub 912 is formed to have plural number of serrations 913. On the side of said panel 901 and around said hub 912, a channel 914 is formed.

Preferably the front case housing 701 has a retaining hub 702 for easy removal with a screw 704 as shown in FIGS. 2 and 3. The hub 702 holds said mirror 502 into the front reinforcing panel 901 with the screw 704.

This retaining hub 702 is also formed to have a plural number of serrations 703 at the edge of the inner side.

Figure 7:
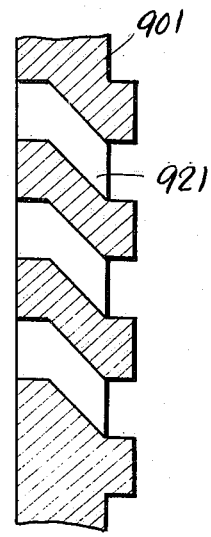
FIG. 7 is a cross-sectional view of the cross section VII—VII of FIG. 5.

The serrations 703 and 913 of the said hub 912 are set to be in line with one another. Then many rectangle shaped windows are formed with the serrations 913 of said panel 901 and the serrations 703 of said hub 702. These windows are provided for the purpose of the passage of audio sound from the loud speaker 508 placed inside of said housing 501. Also another audio sound passage 509 is formed as shown in FIG. 2 and is the structure of plural slots 921 shown in FIGS. 5 and 7. These slots 921 also help to accomplish the passage of audio sound from said loud speaker 508.

The following is the second embodiment. In FIG. 8, on the handle bar 201 of the bicycle, the support arm 301 is tied with a nut 312 and a metal strap 311. On the top end of support arm 301, the rear view mirror 402 is mounted.

This rear view mirror 402 contains a convex or plain mirror 502 and a compartment 524 of the case housing 521 as shown in FIG. 9. The loud speaker 508 is placed for the forward direction in FIG. 10 and backward direction in FIG. 9. The mirror 502 is slightly smaller in size than the front aperture of the case housing 521 and a plural number of retaining tips 522 hold the edge of the mirror 502. Therefore the gap between the case housing 521 and the edge of mirror 502 forms slots for the passage of audio sound from said loud speaker 508.

However, in this embodiment, the audio current signal to said loud speaker 508 is sent through a wire lead 510 from an externally provided radio receiving set. But the radio receiver could be built in as in the previous embodiment.

A third embodiment is now described. In FIG. 11 a rear view mirror 403 comprises a convex or plain mirror 502 and a case housing 531. This said case housing 531 has a compartment 534 which contains a loud speaker 508, a circuit board 511 and a battery. This circuit board 511 is fixed on the center support panel 811 and the control knobs 504 and 505 are placed at the outside rear of the case housing 531 as shown in FIG. 12.

The said mirror 502 is attached on the front reinforcing panel 931 and this said panel 931 is held with a plural number of retaining tips 532 of the aperture of the said housing 531.

Then the gap between the edges of said housing 531 and said panel 931 forms the passage 533 for the audio sound from the loud speaker 508.

The support arm 321 is fixed at the tail end of the case housing 531 in FIG. 11 and the other end of this support arm 321 has four leaf shaped notches 322. The handle bar 201 has a fixture that comprises a metal strap 328 and a screw 324 with a wing nut 325 and on the portion of the metal strap 328, an attachment fixture which comprises a holed threaded shaft 323 with a nut 327 having a threaded tapered end.

Shaft 323 has slots 326 to four ways engage with leaf shaped projections 322 at the end of the support arm 321 so the support arm 321 can be mounted with said nut 327.

Extracting the rear view mirror 403 from the handle bar 201 and fixing it into the stand 331 shown in FIG. 14, results in a stand mirror with a radio receiving set as shown in FIG. 15.

The stand 331 has also the same kind of attachment fixture as the one on the handle bar 201. Hence, the rear view mirror of FIG. 13 can be mounted on either a bicycle or said stand 331.

Although an explanation of a few embodiments has been described and illustrated, it is to be understood that constructive variations may practically be adopted without departing from the scope of this invention as defined in the appended claims.

What we claim is:

1. A rear view mirror for a wheeled vehicle comprising:
   a hollow case housing;
   a mirror mounted on the front surface of said case housing so as to face a driver of the vehicle;
   a loudspeaker and radio receiving means mounted within said case housing behind said mirror; and
   a plurality of slots formed on said front surface of said case housing at the periphery of said mirror for passing the audio sound from said loudspeaker to the outside of said case housing.

2. A rear view mirror for a wheeled vehicle according to claim 1 wherein said radio receiving means comprises control knobs mounted on said front surface of said case housing and extending through said front portion of said case housing from said radio receiving means.

3. A rear view mirror for a wheeled vehicle comprising:
   a hollow case housing;
   means for detachably mounting said hollow case housing to said vehicle;
   a mirror mounted on the front surface of said case housing so as to face a driver of the vehicle;
   a loudspeaker and radio receiving means mounted within said case housing behind said mirror; and
   a plurality of slots formed on said front surface of said case housing at the periphery of said mirror for passing the audio sound from said loudspeaker to the outside of said case housing.

4. A rear view mirror for a wheeled vehicle according to claim 3 wherein said vehicle is a two-wheeled vehicle with a handlebar, and wherein said detachable mounting means includes:
   a back plate on the back surface of said case housing forming a gap for receiving a mounting plate;
   a mounting plate adapted to be removably received in said gap;
   a locking member having a threaded through hole therein; and
   a support arm fixed at one end thereof to the handlebar of the vehicle, said support arm having a bent portion which is threaded and which is threadably engaged with said locking member, said bent portion being secured at the end thereof to said mounting plate, whereby when said mounting plate is inserted into said gap, said back plate is selectively fastened between said mounting plate and said locking member by screwing said locking member against said back plate, said rear view mirror being detachable from the handlebar of the vehicle by unscrewing said locking member to enable removal of said mounting plate from said gap.

5. A rear view mirror for a wheeled vehicle according to claim 4 wherein said hollow case housing comprises a reinforcing panel means mounted in the front portion of said hollow case housing, said reinforcing panel means including water deflection means for deflecting water away from said radio receiving means, thereby protecting said radio receiving means from water leakage through said slots in said hollow case housing.

6. A rear view mirror for a wheeled vehicle according to claim 5 wherein said hollow case housing includes a further panel mounted therein between the front and rear surfaces thereof for forming a front compartment and rear compartment in said hollow case housing, said front compartment being closer to the driver of said vehicle than said rear compartment; and means for mounting said radio receiving means on one surface of said further panel facing said front compartment and for mounting said loudspeaker on the other surface of the further panel facing said rear compartment, said further panel defining sound transmission passages for passing audio sound from said loudspeaker to the outside of said case housing via said front compartment.

7. A rear view mirror for a wheeled vehicle according to claim 4 wherein said mounting plate is generally L-shaped and has a generally upright portion, said generally upright portion being secured to the bent end of said support arm and being adapted to be removably inserted into said gap, the generally horizontally extending portion of said mounting plate extending under said case housing.

8. A rear view mirror for a wheeled vehicle according to claim 4 wherein said mounting plate is threadably secured to the end of the threaded bent portion of said support arm.

9. A rear view mirror for a wheeled vehicle according to claim 4 wherein said back plate has a slot therein for receiving said support arm.

10. A rear view mirror for a wheeled vehicle according to claim 3 further comprising means for mounting the detached mirror on a substantially flat surface, including:
- a substantially flat bottom surface formed on the bottom surface of said case housing; and
- a plurality of stand-off tips projecting from said substantially flat bottom surface of said case housing for engaging said substantially flat mounting surface.

11. A rear view mirror for a wheeled vehicle according to claim 3 wherein said hollow case housing comprises a reinforcing panel means mounted in the front portion of said hollow case housing, said reinforcing panel means including water deflection means for deflecting water away from said radio receiving means, thereby protecting said radio receiving means from water leakage through said slots in said hollow case housing.

12. A rear view mirror for a wheeled vehicle according to claim 11 wherein said hollow case housing includes a further panel mounted therein between the front and rear surfaces thereof for forming a front compartment and rear compartment in said hollow case housing, said front compartment being closer to the driver of said vehicle than said rear compartment; and means for mounting said radio receiving means on one surface of said further panel facing said front compartment and for mounting said loudspeaker on the other surface of the further panel facing said rear compartment, said further panel defining sound transmission passages for passing audio sound from said loudspeaker to the outside of said case housing via said front compartment.

* * * * *